2,922,778

STABILIZATION OF VINYL ALKYL ETHER RESINS

Howard M. Rife and Alexander H. Walker, Charleston, W. Va., assignors to Union Carbide Corporation, a corporation of New York No Drawing. Application December 3, 1956
Serial No. 625,607

6 Claims. (Cl. 260—45.95)

This invention relates to the stabilization of vinyl alkyl ether resins against the degradative effect of light and heat.

The instability of vinyl alkyl ether resins against ultraviolet light and heat has been a problem to the art. Antioxidants, ultraviolet absorbers and heat stabilizing agents have been added to the resins as stabilizers but they have proved inadequate. For example, butylated hydroxyanisole has been used to prevent degradation or discoloration from exposure to ultraviolet light, but it was not so effective as would be desired.

We have now found that vinyl alkyl ether resins can be protected against the degradation effects of ultraviolet light and/or heat by adding thereto a stabilizing amount of mono-tertiary-butylhydroquinone.

The vinyl alkyl ether resins which can be stabilized by the stabilizer of this invention are those resins produced by the polymerization of vinyl alkyl ethers which can be represented by the graphic formula—

$$CH_2=CHOR$$

wherein R represents an alkyl group having from 1 to about 6 carbon atoms, such as vinyl ethyl ether, vinyl propyl ether and vinyl n-butyl ether. These vinyl alkyl ether resins have reduced viscosities ranging from about 0.2 to about 20 at 20° C. as determined from a benzene solution containing 0.2 percent by weight of resin.

The stabilizing amount of mono-tertiary-butylhydroquinone added to the resin can be varied from about 0.3 to about 1 part by weight per 100 parts of resin present. This stabilizer can be added either to the resin free of solvent or it can be added to a solvent solution of the resin.

In the laboratory the stabilizing effect is determined by adding the mono-tertiary-butylhydroquinone to a vinyl alkyl ether resin solution and subjecting the stabilized composition to a certain temperature or to ultraviolet light for a prescribed period of time. The reduced viscosity of this exposed sample is then determined and compared with a resin sample free of any added stabilizer and also with a resin sample containing an equivalent amount of butylated hydroxyanisole, which have been treated under the same conditions.

We have found that the samples stabilized with mono-tertiary-butylhydroquinone consistently gave superior stabilization against heat and/or ultraviolet light.

The appended examples further illustrate the invention. Parts are by weight unless otherwise specified.

Example 1

A vinyl ethyl ether resin solution consisting of 18 parts of resin and 82 parts of toluene and having a reduced viscosity of 3.8 was admixed with 0.5 part of mono-tertiary-butylhydroquinone per 100 parts of resin present in the solution to form a clear solution. A sample containing 0.5 part of butylated hydroxyanisole per 100 parts of resin present in the solution was also prepared. Samples of the unstabilized and stabilized resin solutions were exposed to ultraviolet light at 35° C. in an Atlas Fade-O-Meter. Portions were removed after various periods of time and the reduced viscosities determined. Results are tabulated below:

| Exposure to U.V., Hrs | 0 | 3 | 6 | 9 | 20 |
|---|---|---|---|---|---|
| Stabilizer added: | | | | | |
| None, reduced viscosity | 3.8 | 2.5 | 1.6 | 1.6 | 1.4 |
| Butylated hydroxyanisole, reduced viscosity | 3.8 | 3.2 | 2.6 | 2.4 | 2.2 |
| Mono-tertiary-butyl-hydroquinone, reduced viscosity | 3.8 | 3.7 | 3.6 | 3.4 | 3.0 |

Example 2

The same vinyl ethyl ether resin used in Example 1 was stabilized in the same manner as described therein. Samples of the stabilized resin solutions in sealed tubes were placed in an air oven heated to 135° C. Duplicate samples were removed for the determination of reduced viscosities after the periods of time indicated below. Results are tabulated below:

| Hours at 135° C | 0 | 3 | 24 |
|---|---|---|---|
| Stabilizer added: | | | |
| Butylated hydroxyanisole, reduced viscosity | 3.8 | 2.6 | 1.6 |
| Mono-tertiary-butylhydroquinone, reduced viscosity | 3.8 | 3.6 | 3.4 |

Example 3

A vinyl ethyl ether resin solution consisting of 18 parts of resin and 82 parts of toluene and having a reduced viscosity of 4.5 was admixed with 0.5 part of mono-tertiary-butylhydroquinone per 100 parts of resin present in the solution. A sample containing 0.5 part of butylated hydroxyanisole per 100 parts of resin present in the solution was also prepared. Samples were treated as described in Example 2; results are tabulated below:

| Hours at 135° C | 0 | 3 | 24 |
|---|---|---|---|
| Stabilizer added: | | | |
| Butylated hydroxyanisole, reduced viscosity | 4.5 | 3.4 | 0.82 |
| Mono-tertiary-butylhydroquinone, reduced viscosity | 4.5 | 4.2 | 3.7 |

Example 4

A vinyl ethyl ether resin solution consisting of 18 parts of resin and 82 parts of toluene and having a reduced viscosity of 2.8 was mixed with 0.5 part of mono-tertiary-butylhydroquinone per 100 parts of resin present in the solution. A sample containing 0.5 part of butylated hydroxyanisole per 100 parts of resin present in the solution was also prepared. The samples were exposed to ultraviolet light at 35° C. in an Atlas Fade-O-Meter. The reduced viscosities of the stabilizer-containing exposed resins after 40 hours of exposure were as follows:

Butylated hydroxyanisole _____ 0.3
Mono-tertiary-butylhydroquinone _____ 2.5

Example 5

The same vinyl ethyl ether resin used in Example 4 was stabilized in the same manner as described therein. Samples of the stabilized solutions in sealed tubes were placed in an oven at 130° C. for 24 hours. The reduced viscosities of the stabilizer-containing resins after heating were as follows:

Butylated hydroxyanisole _____ 1.6
Mono-tertiary-butylhydroquinone _____ 2.4

Example 6

A vinyl n-butyl ether resin solution consisting of 7 parts of resin and 93 parts of toluene and having a reduced viscosity of 7.3 was mixed with 0.5 part of mono-tertiary-butylhydroquinone per 100 parts of resin present in the solution. A sample containing 0.5 part of butylated hydroxyanisole per 100 parts of resin present in the solution was also prepared. Samples of the stabilized resin solutions were exposed to ultraviolet light at 35° C. in an Atlas Fade-O-Meter for 40 hours. The reduced viscosities of the stabilizer-containing exposed resins were as follows:

Butylated hydroxyanisole _____ 2.7
Mono-tertiary-butylhydroquinone _____ 4.8

What is claimed is:

1. A composition of matter stabilized against degradation by heat and light, comprising a homopolymeric vinyl alkyl ether resin and a stabilizing amount of mono-tertiary-butylhydroquinone sufficient to stabilize said vinyl alkyl ether resins against degradation by heat and light.

2. A composition of matter stabilized against degradation by heat and light, comprising a homopolymeric vinyl ethyl ether resin, having a reduced viscosity ranging from about 0.2 to about 20 as determined from a benzene solution containing 0.2 percent by weight of resin, and from about 0.3 to about 1 part by weight of mono-tertiary-butylhydroquinone per 100 parts by weight of resin.

3. A composition of matter stabilized against degradation by heat and light, comprising a homopolymeric vinyl n-butyl ether resin, having a reduced viscosity ranging from about 0.2 to about 20 as determined from a benzene solution containing 0.2 percent by weight of resin, and from about 0.3 to about 1 part by weight of mono-tertiary-butylhydroquinone per 100 parts by weight of resin.

4. A composition of matter stabilized against degradation by heat and light, comprising a homopolymeric vinyl alkyl ether resin, selected from the group consisting of vinyl ethyl ether resins, vinyl propyl ether resins and vinyl butyl ether resins, having a reduced viscosity of from about 0.2 to about 20 as determined from a benzene solution containing 0.2 percent by weight of resin, and from about 0.3 to about 1 part by weight of mono-tertiary-butylhydroquinone per 100 parts by weight of resin.

5. A composition of matter stabilized against degradation by heat and light, comprising a homopolymeric vinyl alkyl ether resin, selected from the group consisting of vinyl ethyl ether resins, vinyl propyl ether resins and vinyl butyl ether resins, and at least about 0.5 part by weight of mono-tertiary-butylhydroquinone per 100 parts by weight of resin.

6. A composition of matter stabilized against degradation by heat and light, comprising a homopolymeric vinyl alkyl ether resin, said alkyl group containing from 1 to about 6 carbon atoms, and a stabilizing amount of mono-tertiary-butylhydroquinone sufficient to stabilize said vinyl alkyl ether resins against degradation by heat and light.

References Cited in the file of this patent

UNITED STATES PATENTS

| | | |
|---|---|---|
| 2,226,177 | Orelups | Dec. 24, 1940 |
| 2,748,083 | Hollyday | May 29, 1956 |

OTHER REFERENCES

Schildknecht: "Vinyl and Related Polymers," p. 607, Wiley & Sons (1952). (Copy in Library.)